US012537355B2

(12) United States Patent
Chang et al.

(10) Patent No.: US 12,537,355 B2
(45) Date of Patent: Jan. 27, 2026

(54) POWER STORAGE CONNECTOR

(71) Applicant: JESS-LINK PRODUCTS CO., LTD., New Taipei (TW)

(72) Inventors: Hsu-Feng Chang, New Taipei (TW); Lin Huang, New Taipei (TW)

(73) Assignee: Jess-link Products Co., Ltd., New Taipei (TW)

( * ) Notice: Subject to any disclaimer, the term of this patent is extended or adjusted under 35 U.S.C. 154(b) by 292 days.

(21) Appl. No.: 18/360,116

(22) Filed: Jul. 27, 2023

(65) Prior Publication Data

US 2024/0128699 A1 Apr. 18, 2024

(30) Foreign Application Priority Data

Oct. 18, 2022 (TW) .................................. 111139512

(51) Int. Cl.

| | |
|---|---|
| ***H01R 35/04*** | (2006.01) |
| *H01R 11/12* | (2006.01) |
| *H01R 13/52* | (2006.01) |

(52) U.S. Cl.

CPC .............. *H01R 35/04* (2013.01); *H01R 11/12* (2013.01); *H01R 13/5219* (2013.01)

(58) Field of Classification Search

CPC ..... H01R 35/04; H01R 11/12; H01R 13/5219

See application file for complete search history.

(56) References Cited

U.S. PATENT DOCUMENTS

| | | | | |
|---|---|---|---|---|
| 6,089,897 | A * | 7/2000 | Boussairy | H01R 13/635 439/157 |
| 7,507,125 | B2 * | 3/2009 | Okamura | H01R 13/506 439/903 |
| 7,887,359 | B2 * | 2/2011 | Manser | H01R 13/6272 439/350 |
| 8,651,887 | B2 * | 2/2014 | Zhang | H01R 24/38 439/352 |
| 9,099,797 | B1 * | 8/2015 | Duesterhoeft | H01R 4/58 |
| 9,223,093 | B2 * | 12/2015 | Toda | G02B 6/3887 |
| 9,559,457 | B2 * | 1/2017 | Strahl | H01R 13/622 |
| 9,755,382 | B2 * | 9/2017 | Gniadek | H01R 13/64 |
| 9,819,099 | B2 * | 11/2017 | Finona | H01R 43/048 |

(Continued)

FOREIGN PATENT DOCUMENTS

| | | |
|---|---|---|
| TW | M612275 U | 5/2021 |
| TW | M642755 U | 6/2023 |
| WO | 2020/048871 A | 3/2020 |

*Primary Examiner* — Thanh Tam T Le

(74) *Attorney, Agent, or Firm* — Rosenberg, Klein & Lee

(57) ABSTRACT

A power storage connector includes a socket, a sleeve and a plug. The socket includes a fixed plate, a connecting unit and a fixing component configured on the fixed plate, and a limiting structure configured around the outer side of the connecting unit. The sleeve includes a limited component and a fixing structure configured on the outer sidewall and the inner sidewall of the connecting portion respectively. When the sleeve sleeves on the connecting unit, the limited component is located in the limiting structure and configured to move along the limiting structure, so that the sleeve is capable of rotating on the connecting unit. The plug includes a plug case detachably coupled and linked with the sleeve. The plug case drives the sleeve to rotate to engage the fixing structure and the fixing component, so as to connect and fix the plug to the socket.

10 Claims, 7 Drawing Sheets

(56) References Cited

U.S. PATENT DOCUMENTS

| | | | | |
|---|---|---|---|---|
| 9,837,755 | B2 * | 12/2017 | Hsu | H01R 13/5219 |
| 9,929,497 | B2 * | 3/2018 | Relue | H01R 13/622 |
| 9,960,550 | B2 * | 5/2018 | Ensley | H01R 24/38 |
| 10,141,687 | B2 * | 11/2018 | Hashiguchi | H01R 13/502 |
| 10,348,034 | B1 * | 7/2019 | Chang | H01R 13/6272 |
| 10,634,181 | B2 | 4/2020 | Montague, Jr. et al. | |
| 10,938,152 | B2 * | 3/2021 | Brunet | H01R 13/639 |
| 11,165,205 | B2 | 11/2021 | Dube et al. | |
| 11,296,458 | B2 * | 4/2022 | Penn | H01R 13/6273 |
| 11,626,685 | B1 * | 4/2023 | Benjestorf | H04B 5/22<br>439/527 |
| 11,709,328 | B2 * | 7/2023 | Koreeda | G02B 6/4273<br>385/92 |
| 11,754,792 | B2 * | 9/2023 | Koreeda | G02B 6/387<br>385/58 |
| 11,881,652 | B2 * | 1/2024 | Creazzo | H01R 13/625 |
| 12,155,152 | B2 * | 11/2024 | Guo | H01R 13/639 |
| 12,184,007 | B2 * | 12/2024 | Dobler | H01R 13/6271 |
| 12,294,182 | B2 * | 5/2025 | Karita | H01R 43/0421 |
| 2019/0252095 | A1 | 8/2019 | Mayer et al. | |
| 2019/0252812 | A1 | 8/2019 | Chung et al. | |
| 2021/0226390 | A1 | 7/2021 | Blakborn et al. | |

* cited by examiner

POWER STORAGE CONNECTOR

BACKGROUND OF THE INVENTION

1. Field of the Invention

The present invention relates to a power storage connector, and more particularly, to a power storage connector that can be fixed at multiple angles.

2. Description of the Prior Art

Electrical connectors are connecting components and accessories for electrical signals, and the electronic devices convert and transmit the signal to each other through cables and connectors. That is to say, the electrical connectors are the communicating bridges for the signals. The electrical connectors are widely applied to cars and computer peripheral and communicating data applications, industries, military, transportation, consumer electronics, medical treatments, instruments, commercial equipment and so on. Therefore, the electrical connectors play an important role in many fields.

PAL connector is one of the commonly types of electrical connectors, and can be applied to micro control unit (MCU), motors, batteries, car chargers and so on. PAL connectors are also applied to the energy storage equipment. Since the energy storage cabinet of the energy storage power station has a good volume utilization rate, the electrical connectors are widely used in the energy storage cabinet. The energy storage cabinet mainly comprises power electronic devices such as batteries, inverters, and cables and so on. Usually, the batteries in the energy storage cabinet are arranged to into battery modules, and multiple battery modules are combined by the electrical connectors to form an energy storage system. However, in the current technology with higher signal transmission speed, users demand more and more about the volume and energy density of the energy storage cabinet. Thus, the demand of the electrical connectors for connecting various battery modules is increasing.

The power storage connector comprises a plug and a socket, and the electrical connection of the electronic product is achieved by the plug and the socket plugging with each other. Because the numerous battery modules of the energy storage equipment and the battery modules are arranged closely, the power storage connectors need to be arranged at different angles to connect the battery modules. Furthermore, general energy storage connectors are connected at a single angle. Therefore, when adjusting the angle of the energy storage connector, the user needs to remove the socket from the battery module first, and then adjust the socket to the required angle before reinstalling it, thereby decreasing the convenience. In addition, the energy storage connector is usually connected to each battery module from the outside, and there is still a gap between the plug and the socket of the energy storage connector after being connected. Therefore, moisture or other substances may enter the plug and socket through the gap and affect the terminals, and lead to short circuit and spark, thereby reducing the safety of the equipment.

SUMMARY OF THE INVENTION

Therefore, the present invention provides a power storage connector to solve the problems of the prior art.

In one embodiment of the present invention, the power storage connector includes a socket, a sleeve, and a plug. The socket includes a fixed plate, a connecting unit, a limiting structure and a fixing component. The fixed plate has a plane. The connecting unit protrudes outward from the plane. The limiting structure is configured around the outer side of the connecting unit. The fixing component is arranged on the plane and on the same side of the connecting unit. The sleeve is configured to sleeve the outside of the connecting unit. The sleeve includes a limited component and a fixing structure. The limited component is configured on the inner sidewall of the sleeve. The fixing structure is configured on the outer sidewall of the sleeve and corresponding to the fixing component. When the sleeve sleeves the connecting unit, the limited component is located in the limiting structure and configured to move along the limiting structure, so that the sleeve is capable of rotating on the connecting unit. The plug includes a plug case detachably coupled and linked with the sleeve. The plug case is configured to drive the sleeve to rotate to engage the fixing structure and the fixing component, so as to connect and fix the plug to the socket.

Wherein, the sleeve comprises a positioning groove, and the plug case comprises a rib structure matching the positioning groove. When the plug is connected to the socket, the rib structure is arranged in the positioning groove, and the plug case drives the sleeve to rotate through the rib structure.

Wherein, the limiting structure further comprises a first ring structure and a second ring structure, and a hollow structure is formed between the first ring structure and the second ring structure. The limited component matches the hollow structure and is configured to move along the hollow structure.

Wherein, the fixing structure comprises two arc structures protruding from an outside wall of the sleeve, and a gap is formed between the two arc structures. Then, the fixing component is configured to be arranged in the gap.

Wherein, when the sleeve sleeves the connecting unit, an installing distance is formed between the fixing component and the outside wall of the sleeve, and the fixing structure has a height which is larger than the installing distance.

Wherein, the sleeve comprises a securing slot, and the plug case comprises a securing hole. The plug comprises a securing component configured to move in the securing hole. The securing component is configured to be arranged in the securing slot, so as to connect the plug case to the sleeve.

Wherein, the power storage connector comprises a first seal ring and the connecting unit comprises a groove. The first seal ring is configured in the groove and protrudes from the outside wall of the connecting unit. When the plug is connected to the socket, the first seal ring is configured to seal the gap between the connecting unit and the plug case.

Wherein, the plug further comprises a first plug terminal and a second plug terminal. The first plug terminal is located in the plug case. The second plug terminal is vertically coupled to the first plug terminal.

Wherein, the first plug terminal comprises a bump structure. The second plug terminal comprises a hole. The size of bump structure is larger than the hole, and the bump structure is riveted to the hole.

Wherein, the power storage connector comprises a second seal ring and a third seal ring. The plug comprises a back cover connected to the plug case and perpendicular to the first plug terminal. The second plug terminal is configured in the back cover. The second seal ring is configured in a joint between the plug case and the back cover. The third seal ring is configured in the back cover.

In summary, the power storage connector of the present invention can use the plug to plug in the socket at multiple angles by the sleeve with rotatable and multiple angles fixing, and the socket can be located at the device directly without following the installing angle of the plug, so as to improve practicality and convenience for users. Moreover, the power storage connector of the present invention is waterproof by the sealing rings to protect the terminals and the cables, so as to improve safety.

BRIEF DESCRIPTION OF THE APPENDED DRAWINGS

DETAILED DESCRIPTION OF THE INVENTION

Figure 1:
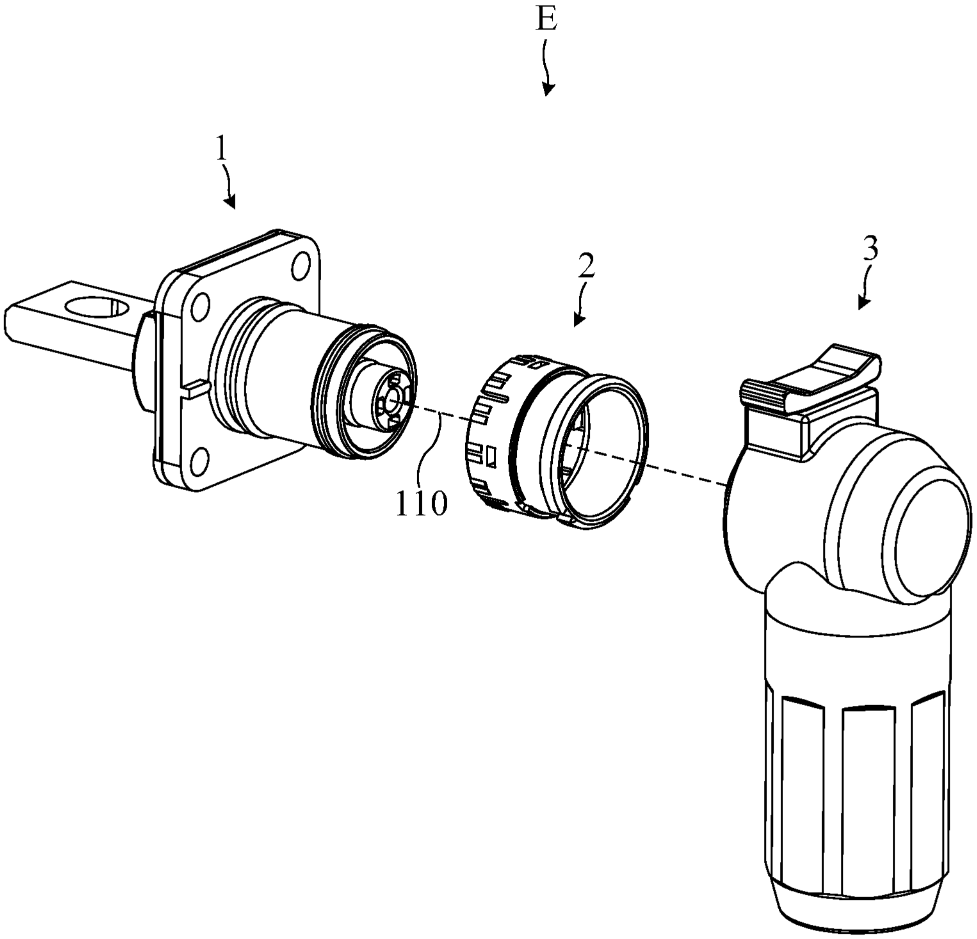
FIG. 1 is an exploded diagram illustrating a power storage connector according to an embodiment of the present invention.

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments. Moreover, the devices in the figures are only used to express their corresponding positions and are not drawing according to their actual proportion.

In the description of the present invention, it is to be understood that the orientations or positional relationships of the terms "longitudinal, lateral, upper, lower, front, rear, left, right, top, bottom, inner, outer" and the like are based on the orientation or positional relationship shown in the drawings. It is merely for the convenience of the description of the present invention and the description of the present invention, and is not intended to indicate or imply that the device or component referred to has a specific orientation, is constructed and operated in a specific orientation, and therefore cannot be understood as limitations of the invention.

In the description of this specification, the description with reference to the terms "a specific embodiment", "another specific embodiment" or "parts of specific embodiments" etc. means that the specific feature, structure, material or feature described in conjunction with the embodiment include in at least one embodiment of the present invention. In this specification, the schematic representations of the above-mentioned terms do not necessarily refer to the same embodiment. Moreover, the described specific features, structures, materials or characteristics can be combined in any one or more embodiments in a suitable manner.

Figure 2:
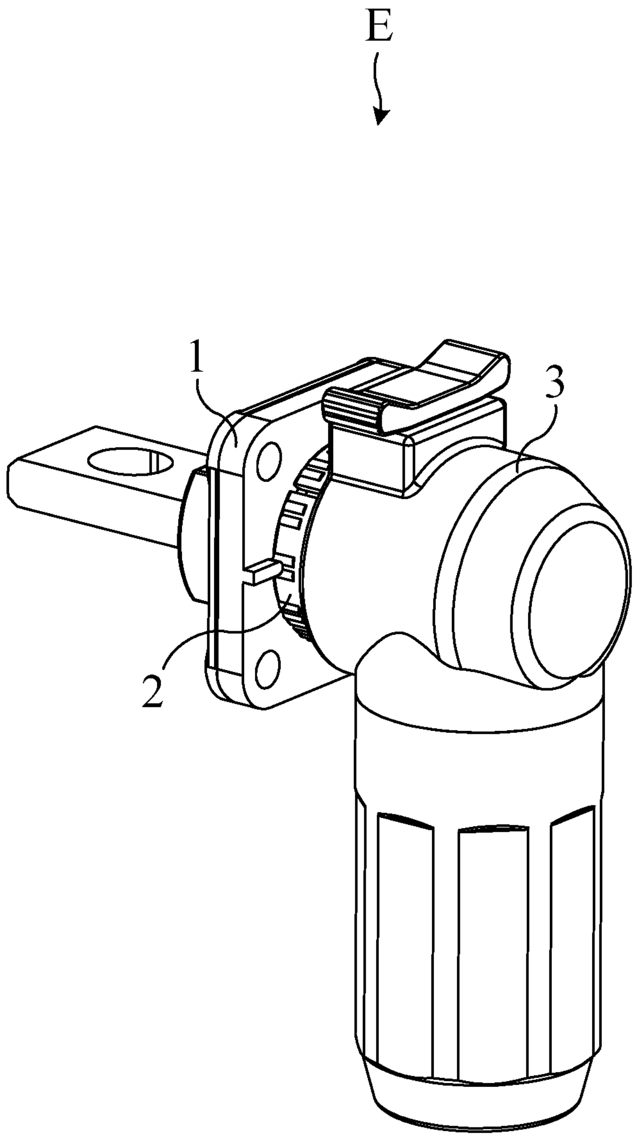
FIG. 2 is an assembly diagram illustrating the power storage connector of FIG. 1.
Figure 3A:
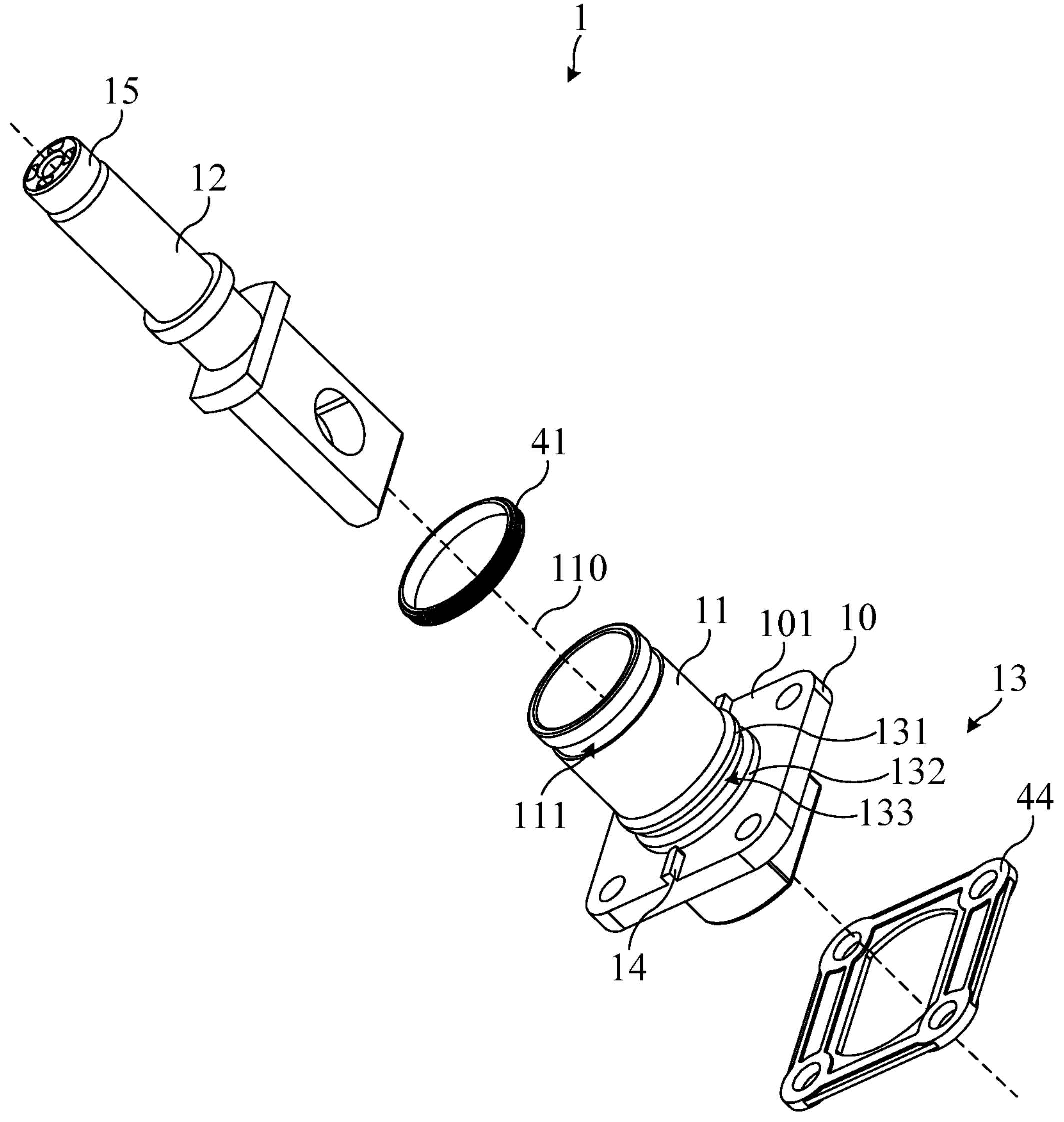
FIG. 3A is an exploded diagram illustrating the socket of FIG. 1.
Figure 3B:
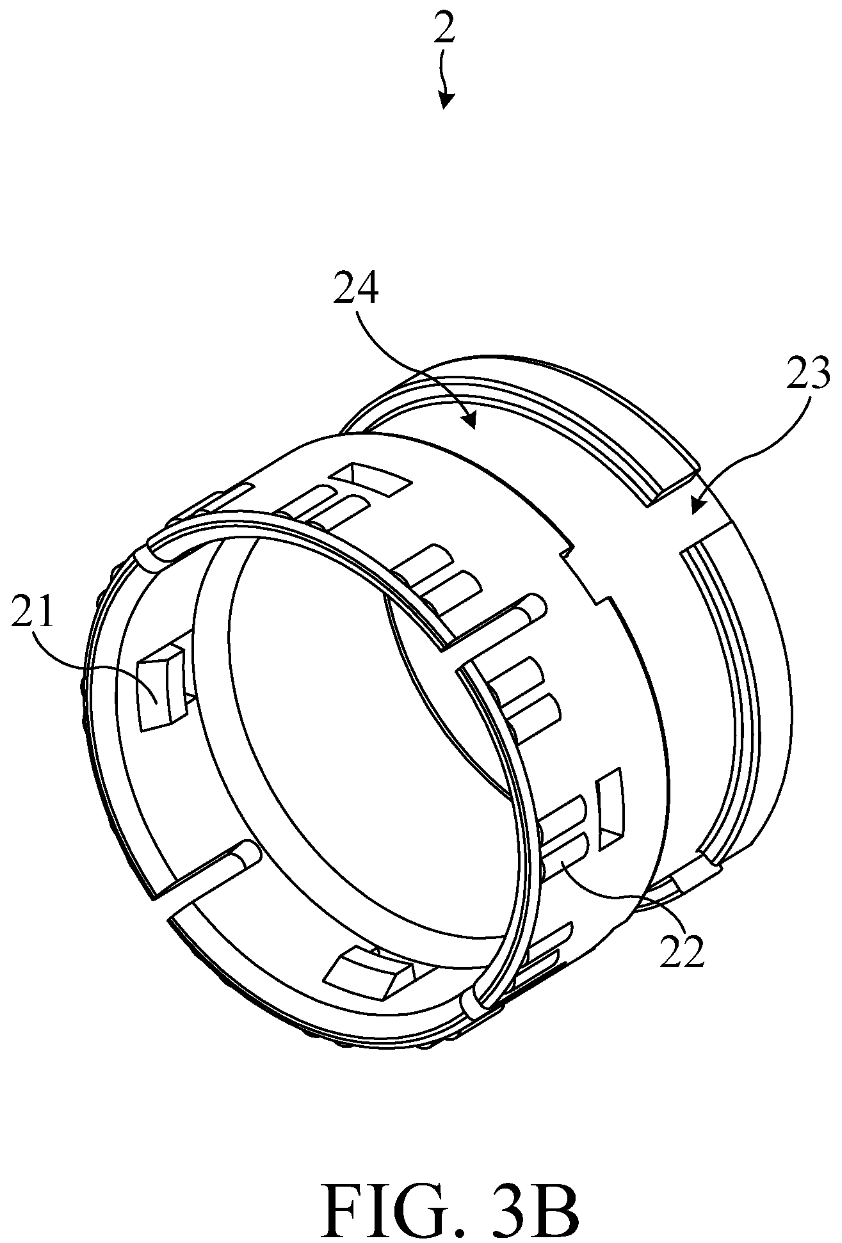
FIG. 3B is a structural schematic diagram illustrating the sleeve of FIG. 1.
Figure 3C:
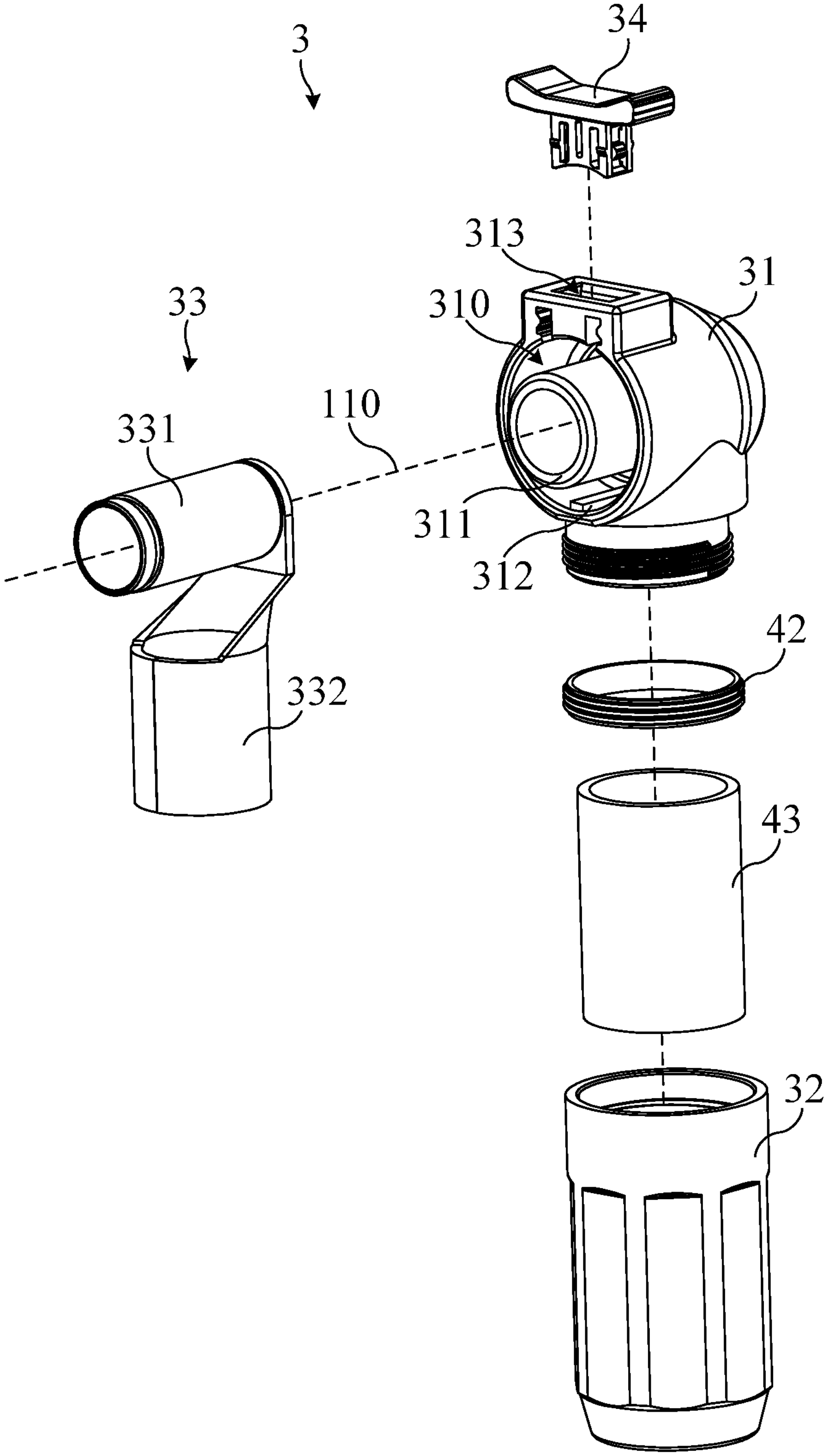
FIG. 3C is an exploded diagram illustrating the plug of FIG. 1.

Please refer to FIG. 1 to FIG. 3C. FIG. 1 is an exploded diagram illustrating a power storage connector according to an embodiment of the present invention. FIG. 2 is an assembly diagram illustrating the power storage connector of FIG. 1. FIG. 3A is an exploded diagram illustrating the socket of FIG. 1. FIG. 3B is a structural schematic diagram illustrating the sleeve of FIG. 1. FIG. 3C is an exploded diagram illustrating the plug of FIG. 1. As shown in FIG. 1 and FIG. 2, the power storage connector E of the present invention includes a socket 1, a sleeve 2 and a plug 3. The sleeve 2 is configured to sleeve the socket 1 and to rotate on the socket 1. The plug 3 matches to the socket 1 and the sleeve 2. The plug 3 is connected to the socket 1 through the sleeve 2.

As shown in FIG. 3A, in the present embodiment, the socket 1 includes a fixed plate 10, a connecting unit 11 and a socket terminal 12. The fixed plate 10 has a plane 101. The connecting unit 11 is configured on the plane 101 and protrudes outward from the plane 101. The connecting unit 11 includes a cylindrical and has an axis 110. The fixed plate 10 further has a hole (not shown) which is configured on the connecting unit 11. The socket terminal 12 passes through the hole of the fixed plate 10 along the axis 110 and one end of the socket terminal 12 is configured in the connecting unit 11. The other end of the socket terminal 12 protrudes from the fixed plate 10. In practice, the fixed plate 10 can be fixed on the equipments or printed circuit boards. When the socket 1 and the plug 3 are connected to each other, the connecting unit 11 and the one end of the socket terminal 12 of the connecting unit 11 is connected to the plug 3, and the other end of the socket terminal 12 can be connected to a cable or a bond pad of the printed circuit board.

As shown in FIG. 2, FIG. 3A and FIG. 3B, the sleeve 2 sleeves the outside of the connecting unit 11 of the socket 1 and is located on the end of the connecting unit 11 which is near the fixed plate 10. The inner diameter of sleeve 2 is corresponding to the outer diameter of the connecting unit 11. Furthermore, the length of sleeve 2 is less than the length of the connecting unit 11. Thus, the connecting unit 11 and the end of the socket terminal 12 protrude from the sleeve 2 to connect with the plug 3 when the sleeve 2 sleeves the connecting unit 11.

In this embodiment, the socket 1 further includes a limiting structure 13 and the sleeve 2 further includes a limited component 21. The limiting structure 13 is configured around the outside of the connecting unit 11. The limited component 21 is configured on the inside wall of the sleeve 2. The limiting structure 13 and the limited component 21 match each other, and the limited component 21 is configured to move in the limiting structure 13. As shown in FIG. 3B and FIG. 3C, the limiting structure 13 is configured at the end of the connecting unit 11 which is near the fixed plate 10, and the limited component 21 is configured at the end of the sleeve 2. Therefore, when the sleeve 2 sleeves the connecting unit 11, the sleeve 2 is configured at the end of the connecting unit 11 which is near the fixed plate 10. In practice, the position of the limiting structure 13 and the limited component 21 can be determined according to the design or requirement.

Moreover, the limiting structure 13 further includes a first ring structure 131 and a second ring structure 132. A hollow structure 133 is formed between the first ring structure 131 and the second ring structure 132, and the shape and the size of the limited component 21 match the hollow structure 133. In practice, the first ring structure 131 and the second ring structure 132 protrude from the outer surface of the connecting unit 11. At this time, a ring-shaped hollow structure

133 is formed between the first ring structure 131 and the second ring structure 132. Therefore, when the sleeve 2 sleeves the connecting unit 11, the limited component 21 of the sleeve 2 will be limited in the hollow structure 133 of the limiting structure 13 and can move along the hollow structure 133, so that the sleeve 2 can rotate with the axis 110 but not move along the axis 110. It should be noted that the shapes and configurations of the limiting structure and the limited component of the present invention are not limited hereto. The limiting structure and the limited component can be any structures matching and capable of relatively moving with each other, so as to enable the sleeve to rotate on the connecting unit.

Furthermore, in the present embodiment, the socket 1 further includes a fixing component 14 and the sleeve 2 further includes a fixing structure 22. The fixing component 14 is configured on the plane 101 of the fixed plate 10 where the connecting unit 11 is configured, and the fixing structure 22 is configured on the outside wall of the sleeve 2. The fixing component 14 and the fixing structure 22 match each other, and the fixing component 14 engages with the fixing structure 22. As shown in FIG. 3B, the fixing structure 22 is located at one end of the connecting unit 11 near the fixed plate 10, and the position of the fixing structure 22 is corresponding to the position of the fixing component 14. Furthermore, the fixing structure 22 includes two arc structures protruding from the outside wall of the sleeve 2, and a gap is formed between the two arc structures. The fixing component 14 protrudes from the plane 101, and the width of the fixing component 14 is equal to or slightly larger than the gap between the two arc structures. As shown in FIG. 3A and FIG. 3B, when the sleeve 2 is configured on the connecting unit 11, an installing distance is formed between the fixing component 14 and the outside wall of the sleeve 2, and the installing distance is smaller than the height of the fixing structure 22. It means that a partial interference is present between the fixing component 14 and the fixing structure 22, so as to engage the fixing component 14 in the gap. When the sleeve 2 rotates on the connecting unit 11, the fixing structure 22 contacts the fixing component 14. Then, when the sleeve 2 continues to rotate and engages the fixing component 14 into the fixing structure 22, the sleeve 2 will be fixed to the connecting unit 11. In addition, the end of the fixing component 14 near the connecting unit 11 can be arc structure. Therefore, the fixing component 14 is capable of moving and sliding with the arc structure when contacting the fixing structure 22, so as to smoothly engage in the fixing structure 22. It should be noted that the shapes and configurations of the fixing component and the fixing structure are not limited hereto. The fixing component and the fixing structure can be any structures capable of matching and engaging to each other.

The above-mentioned fixed plate 10, connecting unit 11, limiting structure 13 and fixing component 14 can be integrally formed to form an outer shell of the socket 1. The above-mentioned limited component 21 and the fixing structure 22 can also be integrally formed with the sleeve 2.

Figure 4:
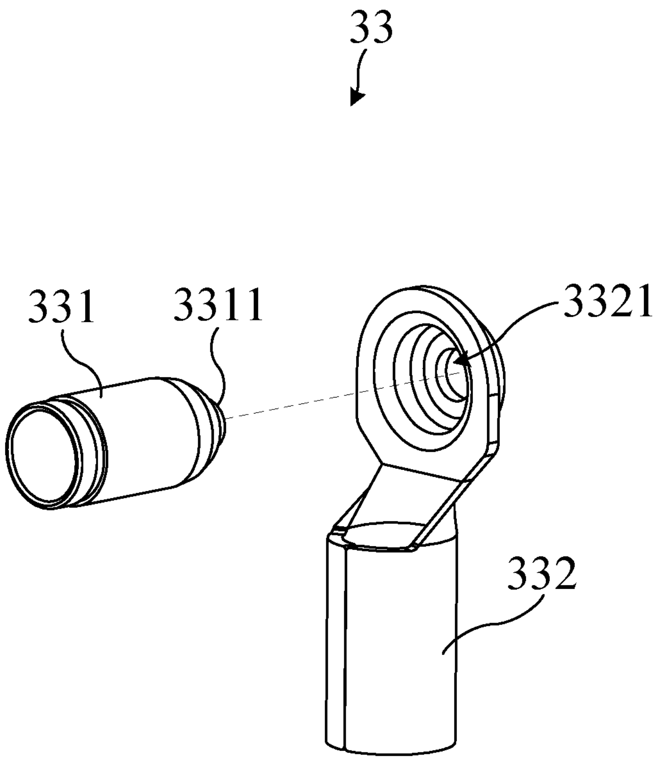
FIG. 4 is an exploded diagram illustrating the plug terminal of the plug of FIG. 3C.

Please refer to FIG. 1, FIG. 3C and FIG. 4. FIG. 4 is an exploded diagram illustrating the plug terminal of the plug of FIG. 3C. As shown in FIG. 1, FIG. 3C and FIG. 4, in the present embodiment, the plug 3 includes a plug case 31, a back cover 32 and a plug terminal 33. The plug case 31 has a containing space 310 for containing the plug terminal 33, connecting unit 11 of the socket 1 and the sleeve 2. The shape of the containing space 310 is roughly cylindrical, and the size of the containing space 310 is corresponding to the size of the sleeve 2. When the socket 1 and the plug 3 are connected to each other, the plug 3 contacts the outside of the sleeve 2 and the end of the connecting unit 11 protruding from the sleeve 2 along the axis center 110. Furthermore, the plug case 31 includes a sleeve structure 311 configured in the containing space 310 to be connected to the socket terminal 12 of the socket 1. In addition, the plug case 31 has a cavity located at the bottom part of the plug case 31, and the cavity is vertically connected to the containing space 310. The bottom of the plug case 31 has an opening connected to the cavity, and the back cover 32 is detachably connected to the plug case 31 and sleeves the opening of the plug case 31. That is to say, the shape of the plug 3 is L-shaped.

The plug terminal 33 includes a first plug terminal 331 and a second plug terminal 332 perpendicularly coupled to each other. The first plug terminal 331 is configured in the sleeve structure 311, and the second plug terminal 332 is configured in the cavity and locates in the back cover 32. In practice, the first plug terminal 331 is configured to be electrically connected to the socket terminal 12, and the second plug terminal 332 is configured to be electrically connected to the cable (not shown). Furthermore, as shown in FIG. 4, the first plug terminal 331 includes a bump structure 3311, and the second plug terminal 332 includes a hole 3321. The size of the bump structure 3311 is larger than the size of the hole 3321. The bump structure 3311 is connected to the hole 3321 by riveting, so as to reliably connect the bump structure 3311 and the hole 3321 to form the plug terminal 33. In addition, the junction of the bump structure 3311 and the hole 3321 can be embossed to improve the structural strength and stability of the plug terminal 33.

Please refer to FIG. 1, FIG. 3B and FIG. 3C again. In the present embodiment, the plug case 31 further includes a rib structure 312, and the sleeve 2 further includes a positioning groove 23. The rib structure 312 is configured on the inner sidewall of the plug case 31 and locates in the containing space 310. The positioning groove 23 recesses inwardly from the outside wall of the sleeve 2 and is configured at the other end of the sleeve 2 opposite to the end where the fixing structure 22 is configured. The rib structure 312 and the positioning groove 23 match each other. When the plug 3 connects to the socket 1, the rib structure 312 of the plug case 31 engages in the positioning groove 23 of the sleeve 2, and the plug case 31 drives the sleeve 2 to rotate by the rib structure 312. It should be noted that the shapes and the configurations of the rib structure and the positioning groove of the present invention are not limited to the figures. The rib structure and the positioning groove can be any structures matching and engaging with each other. Moreover, the number of rib structure and positioning groove are not limited to one as shown the figures, and the rib structure and positioning groove also can be determined according to the design or requirement.

In the present embodiment, the plug 3 includes a securing component 34, the plug case 31 includes a securing hole 313, and the sleeve 2 includes a securing slot 24. The securing hole 313 is connected to the containing space 310. The securing component 34 is configured in the securing hole 313 to move in the securing hole 313. The securing slot 24 inwardly concaves from the outer wall of the sleeve 2 and is configured at one end of the sleeve 2 opposite to the end where the fixing structure 22 is configured. Furthermore, the securing hole 313 is configured on the top of the plug case 31, and the extending direction of the securing hole 313 is perpendicular to the axis 110. Moreover, when the plug 3 is plugged into the socket 1, the position of the securing slot 24 is corresponding to the position of the securing hole 313.

Therefore, when the plug 3 is connected to the socket 1 and contacts the sleeve 2, the securing component 34 of the plug case 31 moves downward along the direction perpendicular to the axis 110 and then protrudes in the containing space 310 to engage in the securing slot 24 of the sleeve 2, so as to fix the plug 3 and the sleeve 2. In addition, the securing component 34 of the plug case 31 can also move upwards along the direction perpendicular to the axis 110 to disengage from the securing slot 24, so that the plug 3 can be separated from the sleeve 2.

Figure 5:
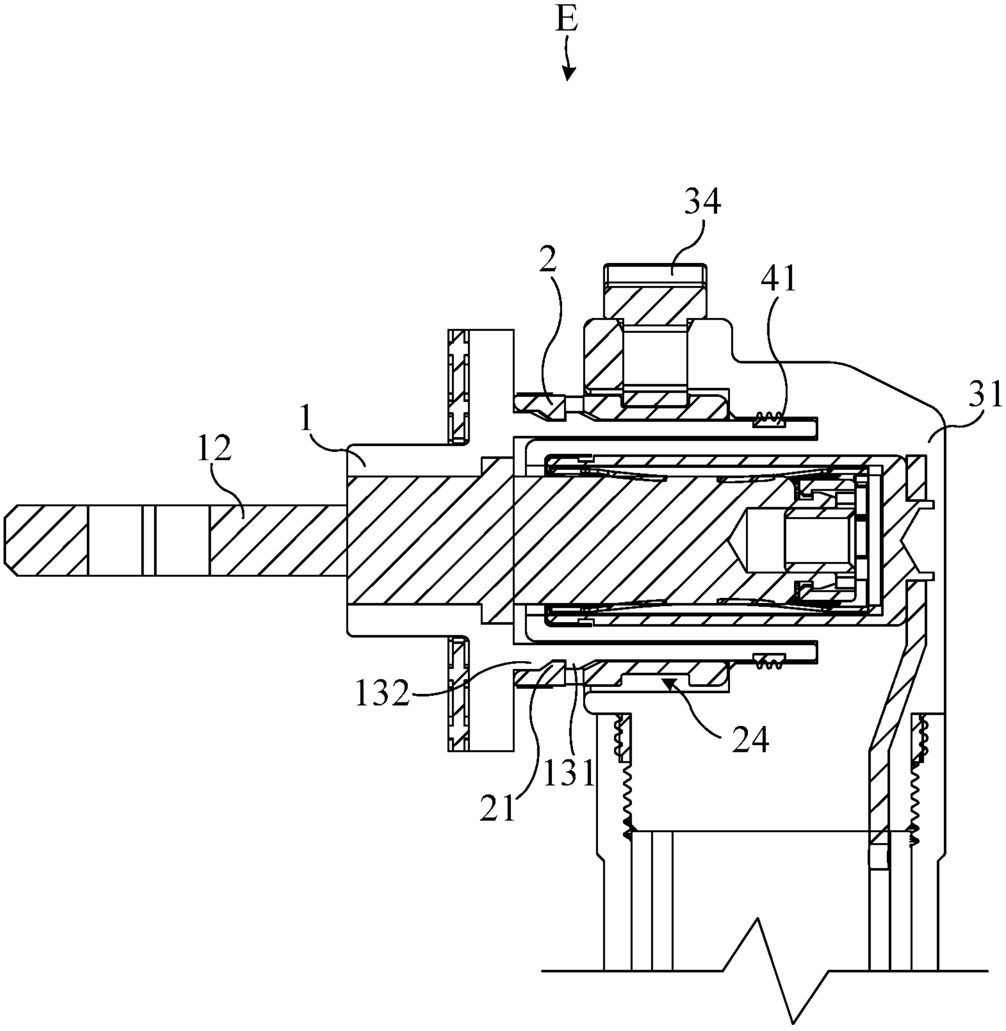
FIG. 5 is a sectional diagram illustrating the power storage connector of FIG. 2.

Please refer to FIG. 3A, FIG. 3B, FIG. 3C and FIG. 5. FIG. 5 is a sectional diagram illustrating the power storage connector E of FIG. 2. As shown in FIG. 5, before the plug 3 and the socket 1 are connected to each other, the sleeve 2 sleeves the socket 1 at first. When the plug 3 is connected to the socket 1, the sleeve structure 311 of the plug 3 is connected to the connecting unit 11 protruding from the sleeve 2 of the socket 1. At this time, the sleeve structure 311 is located between the socket terminal 12 and the connecting unit 11, and the first plug terminal 331 of the plug 3 is electrically connected to the socket terminal 12. While the sleeve structure 311 is connected to the connecting unit 11, the rib structure 312 of the plug case 31 also engages in the positioning groove 23 of the sleeve 2, so as to configure the sleeve 2 and the connecting unit 11 between the plug case 31 and the sleeve structure 311. Then, the securing component 34 of the plug case 31 moves down and engages in the securing slot 24 of the sleeve 2. At this time, the plug case 31 and the sleeve 2 can be regarded as one component, and the plug case 31 links the plug 3 and the sleeve 2 to rotate on the connecting unit 11 of the socket 1 through the limited component 21 of the sleeve 2. Furthermore, when the plug 3 drives the sleeve 2 to rotate and makes the fixing component 14 of the socket 1 to engage with the fixing structure 22 of the sleeve 2, the sleeve 2 will be fixed to the connecting unit 11, so as to connect and fix the plug 3 to the socket 1.

In practice, when the plug 3 drives the sleeve 2 to rotate, the back cover 32 of the plug 3 for connecting to the cable will also be configured at different angles by the rotation. In the present embodiment, the sleeve 2 further includes a plurality of fixing structures 22 evenly configured around the outside wall of one end of the sleeve 2. In practice, the fixing structures 22 can be respectively configured at different angles. For example, the sleeve 2 can include four fixing structures 22, and the fixing structures 22 can be respectively configured at the positions of 0°, 90°, 180° and 270°. Therefore, when the rotating the plug 3 to drive the sleeve 2 to rotate, the user selectively engages the fixing component 14 of the socket 1 to one of the fixing structures 22, so as to make the plug 3 to be connected to the socket 1 at different angles. The number of fixed structures can be determined according to the design or requirement. Thus, the power storage connector of the present invention is configured to plug the plug in the socket at multiple angles by the sleeve which is rotatable and can be fixed at multiple angles, and the socket is directly fixed on the device without following the configuration position or direction of the plug, so as to improve practicality and convenience.

As shown in FIG. 3A and FIG. 3C, and FIG. 5, in the present embodiment, the power storage connector E further includes a first seal ring 41 and the connecting unit 11 includes a groove 111. The groove 111 is configured on one end of the connecting unit 11 which is opposite to the fixed plate 10, that is, the end of the connecting unit 11 protrudes from the sleeve 2. The first seal ring 41 is configured in the groove 111 and protrudes from the outside wall of the connecting unit 11. As shown in FIG. 5, after the plug 3 connects to the socket 1, there is a gap between the inner wall of the plug case 31 and the connecting unit 11. The first seal ring 41 is located between the inner wall of the plug case 31 and the connecting unit 11 to seal the gap, so as to prevent water or other substances from entering the gap and contacting the plug terminal 33 or the socket terminal 12, which would cause short circuit, to improve the safety.

Moreover, the power storage connector E further includes a second seal ring 42 configured at the joint between the plug case 31 and the back cover 32. In practice, the back cover 32 is detachably configured on the plug case 31, and water or other substances may enter the plug 3 from the joint between the plug case 31 and the back cover 323. Therefore, the second seal ring 42 is capable of preventing water or other substances from contacting the second plug terminal 332, which would cause short circuit, to improve safety. In addition, the power storage connector E further includes a third seal ring 43 configured in the back cover 32. In practice, the second plug terminal 332, the cable and the joint between the second plug terminal 332 and the cable are all configured in the back cover 32, so the third seal ring 43 is capable of prevent water or other substances from entering the back cover 32 and contacting the second plug terminal 332 and the cable, which would cause short circuit, to improve safety.

Furthermore, the socket 1 further includes a seal washer 44 and an insulating component 15. The seal washer 44 is configured on the other side of the fixed plate 10 opposite to the other side where the connecting unit 11 is configured, and the insulating component 15 is configured at the end of the socket terminal 12. In practice, the seal washer 44 can be configured at the joint between the socket 1 and the equipment to increase the sealing and prevent other substances from entering the socket 1 or the equipment. The insulating component 15 prevents the users from directly contacting the socket terminals to avoid accidents such as electric shock, so as to improve safety.

In summary, the power storage connector of the present invention improves practicality and convenience for users by the plug 3 which is connected to the socket 1 through the rotatable and multiple angles fixing of the sleeve 2. Moreover, the power storage connector of the present invention is waterproof by the sealing rings to protect the terminals and the cables, so as to improve the safety.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A power storage connector, comprising:

a socket, comprising a fixed plate, a connecting unit, a limiting structure and a fixing component, the fixed plate having a plane and the connecting unit protruding outward from the plane, the limiting structure being configured around the outer side of the connecting unit, the fixing component being configured on the plane and on the same side of the connecting unit;

a sleeve, configured to sleeve the outside of the connecting unit, the sleeve comprising a limited component and a fixing structure, the limited component being configured on the inner sidewall of the sleeve and the fixing structure being configured on the outer sidewall of the sleeve and corresponding to the fixing component, when the sleeve sleeves the connecting unit, the limited component is located in the limiting structure and configured to move along the limiting structure, so that the sleeve is capable of rotating on the connecting unit; and a plug, comprising a plug case detachably coupled and linked with the sleeve, the plug case be configured to drive the sleeve to rotate and engage the fixing structure and the fixing component, so as to connect and fix the plug to the socket at different angles.

2. The power storage connector of claim 1, wherein the sleeve comprises a positioning groove, and the plug case comprises a rib structure matching the positioning groove, when the plug is connected to the socket, the rib structure is arranged in the positioning groove, and the plug case drives the sleeve to rotate through the rib structure.

3. The power storage connector of claim 1, wherein the limiting structure further comprises a first ring structure and a second ring structure, and a hollow structure is formed between the first ring structure and the second ring structure, the limited component matches the hollow structure and is configured to move along the hollow structure.

4. The power storage connector of claim 1, wherein the fixing structure comprises two arc structures protruding from an outside wall of the sleeve, and a gap is formed between the two arc structures, the fixing component is configured to be arranged in the gap.

5. The power storage connector of claim 4, wherein when the sleeve sleeves the connecting unit, an installing distance is formed between the fixing component and the outside wall of the sleeve, and the fixing structure has a height which is larger than the installing distance.

6. The power storage connector of claim 1, wherein the sleeve comprises a securing slot, the plug case comprises a securing hole, and the plug comprises a securing component configured to move in the securing hole, the securing component is configured to be arranged in the securing slot, so as to connect the plug case to the sleeve.

7. The power storage connector of claim 1, wherein the power storage connector comprises a first seal ring and the connecting unit comprises a groove, the first seal ring is configured in the groove and protrudes from the outside wall of the connecting unit, when the plug is connected to the socket, the first seal ring is configured to seal the gap between the connecting unit and the plug case.

8. The power storage connector of claim 1, wherein the plug further comprises a first plug terminal and a second plug terminal, the first plug terminal is located in the plug case, and the second plug terminal is vertically coupled to the first plug terminal.

9. The power storage connector of claim 8, wherein the first plug terminal comprises a bump structure and the second plug terminal comprises a hole, the size of bump structure is larger than the hole, and the bump structure is riveted to the hole.

10. The power storage connector of claim 8, wherein the power storage connector comprises a second seal ring and a third seal ring, and the plug comprises a back cover connected to the plug case and perpendicular to the first plug terminal, and the second plug terminal is configured in the back cover, the second seal ring is configured in a joint between the plug case and the back cover, and the third seal ring is configured in the back cover.

* * * * *